United States Patent
Kim et al.

(10) Patent No.: US 12,009,587 B2
(45) Date of Patent: *Jun. 11, 2024

(54) ANTENNA MODULE

(71) Applicant: KESPION Co., Ltd., Incheon (KR)

(72) Inventors: Hee Su Kim, Gyeonggi-do (KR);
Gwan Woo Son, Gyeonggi-do (KR);
Won Ro Lee, Gyeonggi-do (KR)

(73) Assignee: KESPION CO., LTD., Incheon (KR)

( * ) Notice: Subject to any disclaimer, the term of this patent is extended or adjusted under 35 U.S.C. 154(b) by 211 days.

This patent is subject to a terminal disclaimer.

(21) Appl. No.: 17/585,821

(22) Filed: Jan. 27, 2022

(65) Prior Publication Data

US 2022/0173505 A1    Jun. 2, 2022

Related U.S. Application Data

(63) Continuation-in-part of application No. PCT/KR2021/002173, filed on Feb. 22, 2021.

(30) Foreign Application Priority Data

Feb. 28, 2020    (KR) .................... 10-2020-0024872

(51) Int. Cl.
*H01Q 1/38*      (2006.01)
*H01Q 1/36*      (2006.01)
*H01Q 1/52*      (2006.01)

(52) U.S. Cl.
CPC .............. *H01Q 1/38* (2013.01); *H01Q 1/364* (2013.01); *H01Q 1/526* (2013.01)

(58) Field of Classification Search
None
See application file for complete search history.

(56) References Cited

U.S. PATENT DOCUMENTS

2014/0028518 A1* 1/2014 Arnold ................ H01Q 1/2283
                                                    343/841
2022/0149515 A1* 5/2022 Kim ...................... H01Q 1/526

FOREIGN PATENT DOCUMENTS

| KR | 10-1163574 B1 | 7/2012 |
| KR | 10-2014-0110175 A | 9/2014 |
| KR | 10-2015-0045421 A | 4/2015 |
| KR | 10-2018-0111709 A | 10/2018 |
| KR | 10-2019-0014872 A | 2/2019 |

OTHER PUBLICATIONS

International Search Report for PCT/KR2021/002173 mailed on Jun. 3, 2021.

* cited by examiner

*Primary Examiner* — Jany Richardson
(74) *Attorney, Agent, or Firm* — The PL Law Group, PLLC

(57) ABSTRACT

An antenna module according to an embodiment of the present disclosure enables the size of a wireless communication terminal to be reduced by the implementation, as a first antenna formed by an MID method and a second antenna formed on an FPCB, of the antenna module used in the wireless communication terminal. The antenna module is capable of performing a plurality of communication functions through a single antenna module by enabling the first antenna to function as a near-field communication (NFC) antenna and the second antenna to function as a magnetic secure transmission (MST) antenna.

14 Claims, 6 Drawing Sheets

ANTENNA MODULE

CROSS-REFERENCE TO RELATED APPLICATION AND CLAIM OF PRIORITY

The present application is a Continuation-In-Part of application to International Application No. PCT/KR2021/002173 with an International Filing Date of Feb. 22, 2021, which claims the benefit of Korean Patent Application No. 10-2020-0024872 filed on Feb. 28, 2020 at the Korean Intellectual Property Office, the disclosures of which are incorporated by reference herein in their entirety

BACKGROUND

1. Field

The present invention relates to an antenna module and, more specifically, to an antenna module capable of reducing the size thereof by implementing an antenna module used in a wireless communication terminal as a first antenna formed by an MID (Molded Interconnect Device) method and a second antenna formed on an FPCB.

In addition, the present invention relates to an antenna module, in which a first antenna functions as an NFC (Near Field Communication), and a second antenna functions as an MST (Magnetic Secure Transmission), so that a plurality of communication functions can be performed with one antenna module.

2. Description of the Related Art

A wireless communication terminal needs to essentially include an antenna. Existing external antennas deteriorate the external appearance and cause inconvenience to users. Recently, technology development for internal antennas has been actively carried out.

Meanwhile, the demand for multimedia data communication as well as the call function, which is the basis of a wireless communication terminal, has recently increased rapidly, and accordingly, a wireless communication terminal equipped with a plurality of antennas is required.

In addition, the demand for NFC (Near Field Communication) antennas is increasing to implement functions such as information exchange, payment, ticket reservation, and wireless charging between terminals in addition to long-distance wireless communication. For this reason, there is a trend that the wireless communication terminal is equipped with an NFC antenna.

Further, the demand for the implementation of the MST (Magnetic Secure Transmission) function for credit card payment using the wireless communication terminal is increasing, and accordingly, there is a trend that the MST antenna is provided in the wireless communication terminal.

As described above, since a plurality of antennas are provided, the antenna module used in the wireless communication terminal becomes thick, so there is a problem that it goes against the recent trend of slimming the wireless communication terminal for improving the portability of the wireless communication terminal.

SUMMARY

Accordingly, the technical task of the present invention has been conceived in this regard, and the present invention provides an antenna module capable of reducing the size thereof by implementing an antenna module used in a wireless communication terminal as a first antenna formed by an MID (Molded Interconnect Device) method and a second antenna formed on an FPCB.

In addition, the present invention provides an antenna module, in which a first antenna functions as an NFC (Near Field Communication), and a second antenna functions as an MST (Magnetic Secure Transmission), so that a plurality of communication functions can be performed with one antenna module.

According to an embodiment of the present invention, there is provided an antenna module that includes: a first antenna formed on one surface of an injection-molded product; and a second antenna spaced apart from the first antenna and formed on one surface of a flexible printed circuit board (FPCB).

The injection-molded product may include an antenna carrier or a case of a wireless communication terminal.

The first antenna may include an antenna for Near Field Communication (NFC), and the second antenna may include an antenna for Magnetic Secure Transmission (MST)

The antenna module may include a shielding layer configured to at least partially overlap the first antenna formed on the injection-molded product to shield electromagnetic waves.

The shielding layer may be formed on the other surface of the injection-molded product at a position corresponding to a position of the first antenna.

The shielding layer may include ferrite.

The shielding layer may be configured to correspond to an outer peripheral shape of the first antenna.

The first antenna may include a first plating layer including Cu and a second plating layer including Ni.

The first plating layer may have a thickness of 10~15 and the second plating layer has a thickness of 1~5 μM.

A contact circuit may be formed on the other surface of the injection-molded product of the first antenna, and the first antenna and the contact circuit may be electrically connected to each other.

The first antenna and the contact circuit may be connected to each other through a via hole.

A nano sheet layer may be formed on the other surface of the second antenna.

A protective film layer may be formed on one surface of the second antenna.

According to an embodiment of the present invention, the size of the wireless communication terminal can be reduced by implementing the antenna module used in the wireless communication terminal with the first antenna formed by the MID method and the second antenna formed on the FPCB.

In addition, the first antenna functions as NFC (Near Field Communication) and the second antenna functions as MST (Magnetic Secure Transmission), so that a plurality of communication functions can be performed with one antenna module.

Effects of the present invention may not be limited to the above, and other effects that are not mentioned will be clearly understandable to those having ordinary skill in the art from the appended claims.

BRIEF DESCRIPTION OF THE DRAWINGS

The summary described above as well as the detailed description of the exemplary embodiments of the present application to be described below may be better understood when read in conjunction with the accompanying drawings. For the purpose of illustrating the present invention, exemplary embodiments are shown in the drawings. However it should be understood that the present application is not limited to the arrangements and means shown in the drawings.

DETAILED DESCRIPTION

Figure 1:
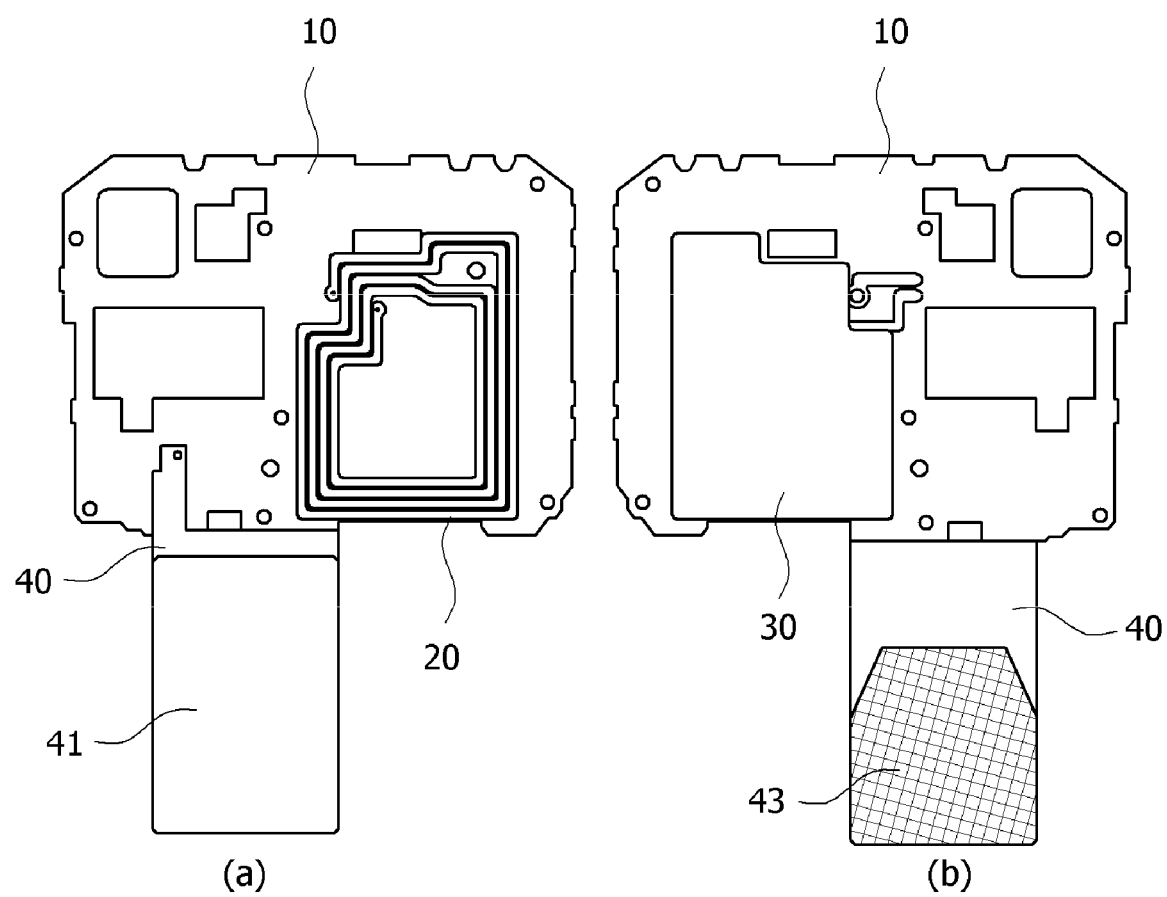
FIG. 1 is a reference view for explaining an antenna module according to an embodiment of the present invention, in which (a) is a front surface of the antenna module, and (b) is a rear surface of the antenna module.

Hereinafter, various embodiments of the present invention will be described in detail with reference to the accompanying drawings. However, the features of the embodiment disclosed in the present specification will be more clearly understood from the accompanying drawings and should not be limited by the accompanying drawings. It will be readily apparent to those skilled in the art that the scope of the present invention is not limited to the scope of the accompanying drawings.

In describing the embodiments of the present invention, the same names and reference numerals are used for the components having the same functions, and it is stated in advance that they are not substantially the same as the components of the related art.

Terms used in this disclosure are used to describe specified examples of the present invention and are not intended to limit the scope of the present invention. The terms of a singular form may include plural forms unless otherwise specified. In the present invention, terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Hereinafter, an antenna module according to the present invention will be described in detail with reference to accompanying drawings. In the following description, the same reference numerals will be assigned to the same or corresponding elements and redundant description thereof will be omitted.

Figure 2:
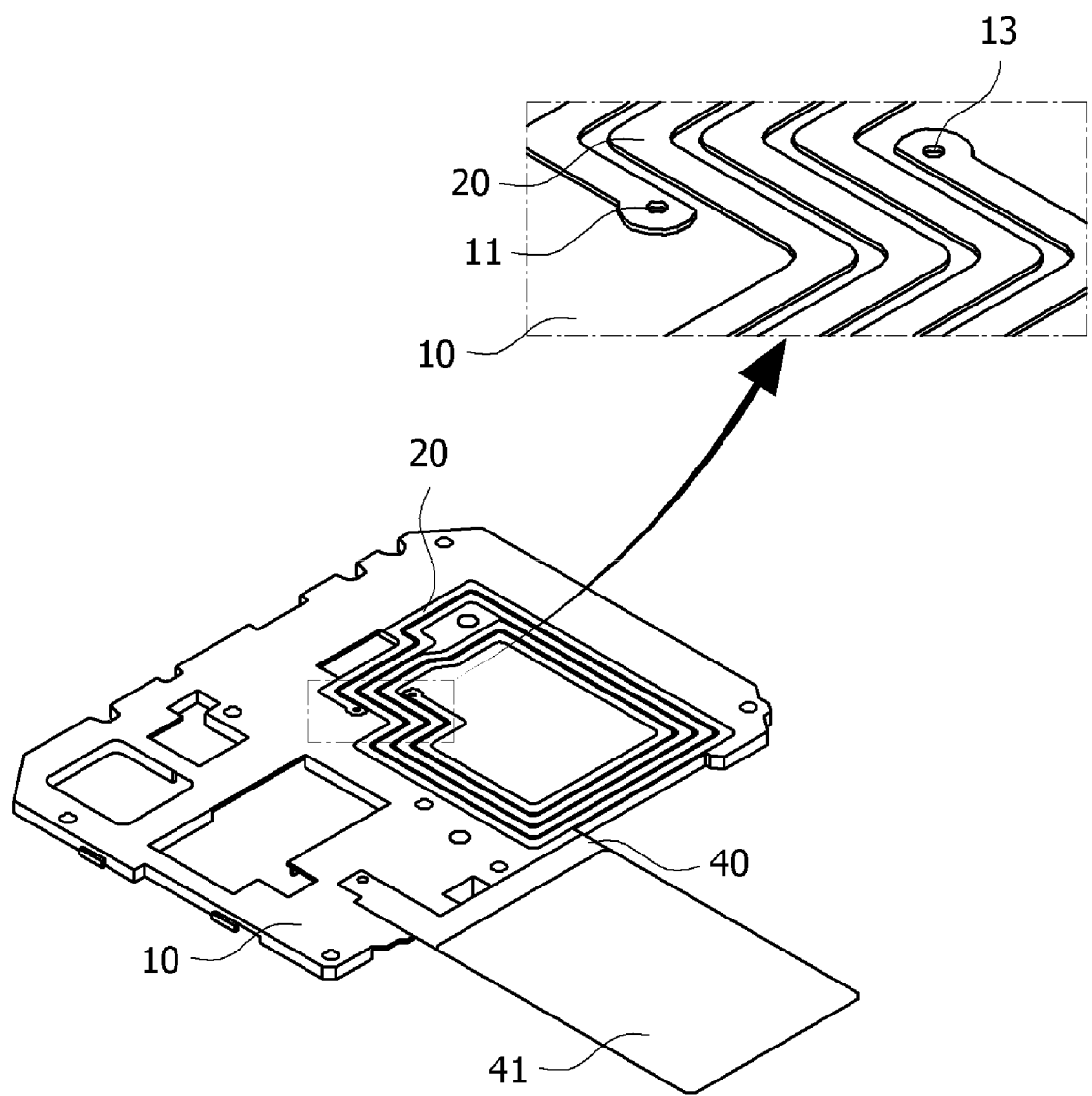
FIG. 2 shows a perspective view and a partially enlarged view of a front surface of the antenna module according to an embodiment of the present invention.
Figure 3:
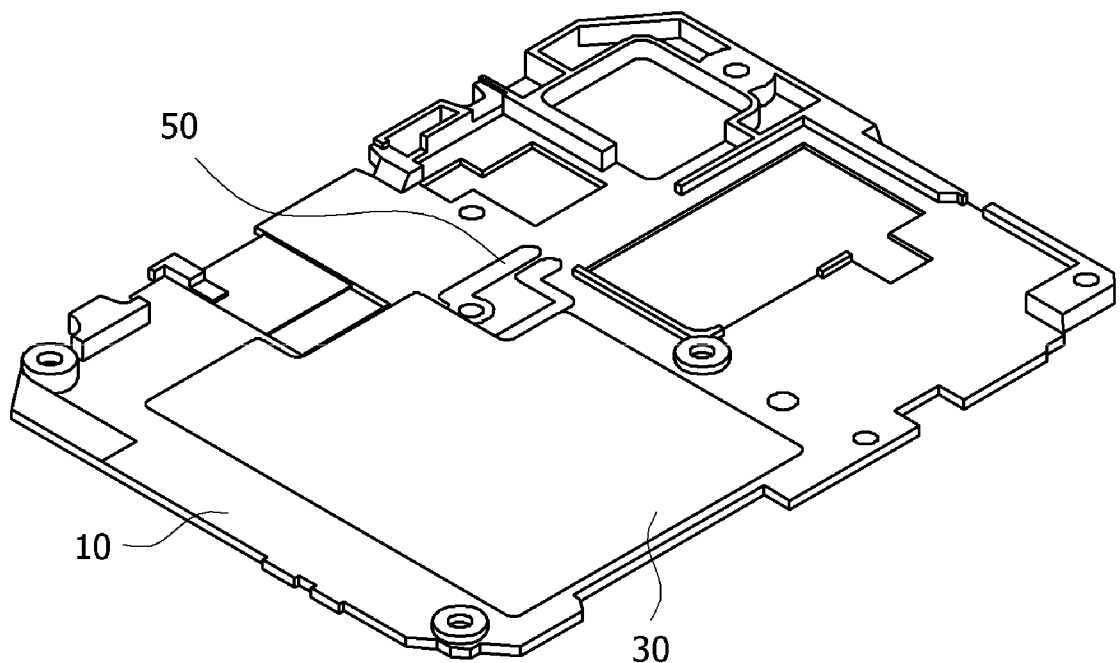
FIG. 3 is a perspective view of a rear surface of the antenna module according to an embodiment of the present invention.
Figure 4:
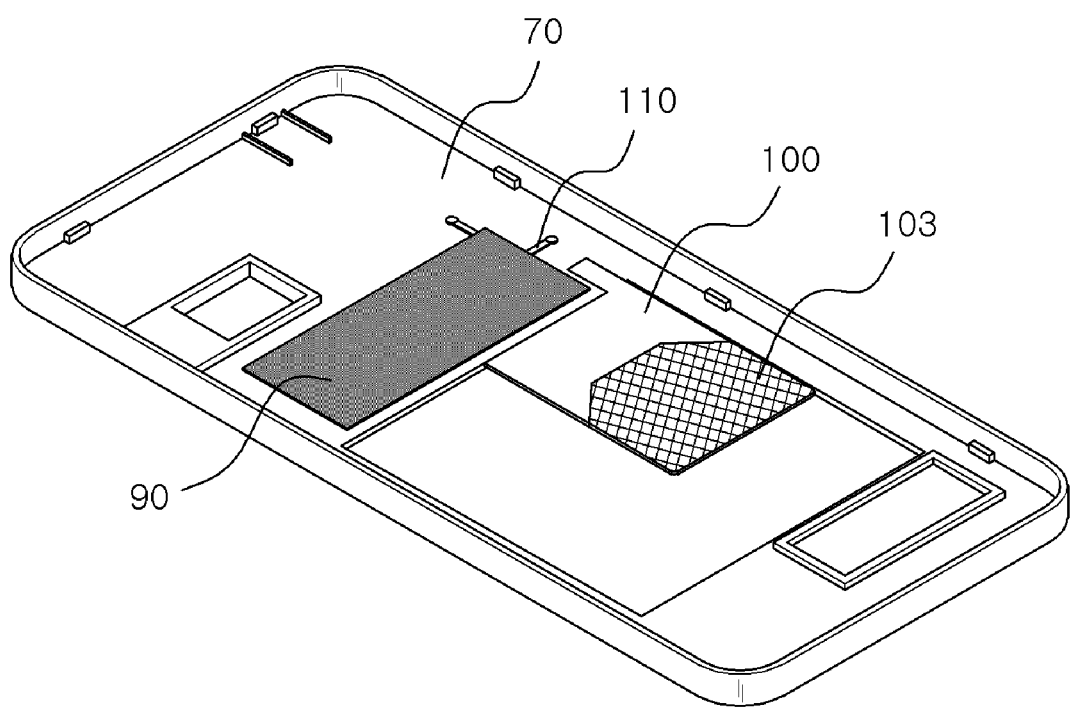
FIG. 4 is a schematic view of an antenna module according to another embodiment of the present invention.
Figure 5:
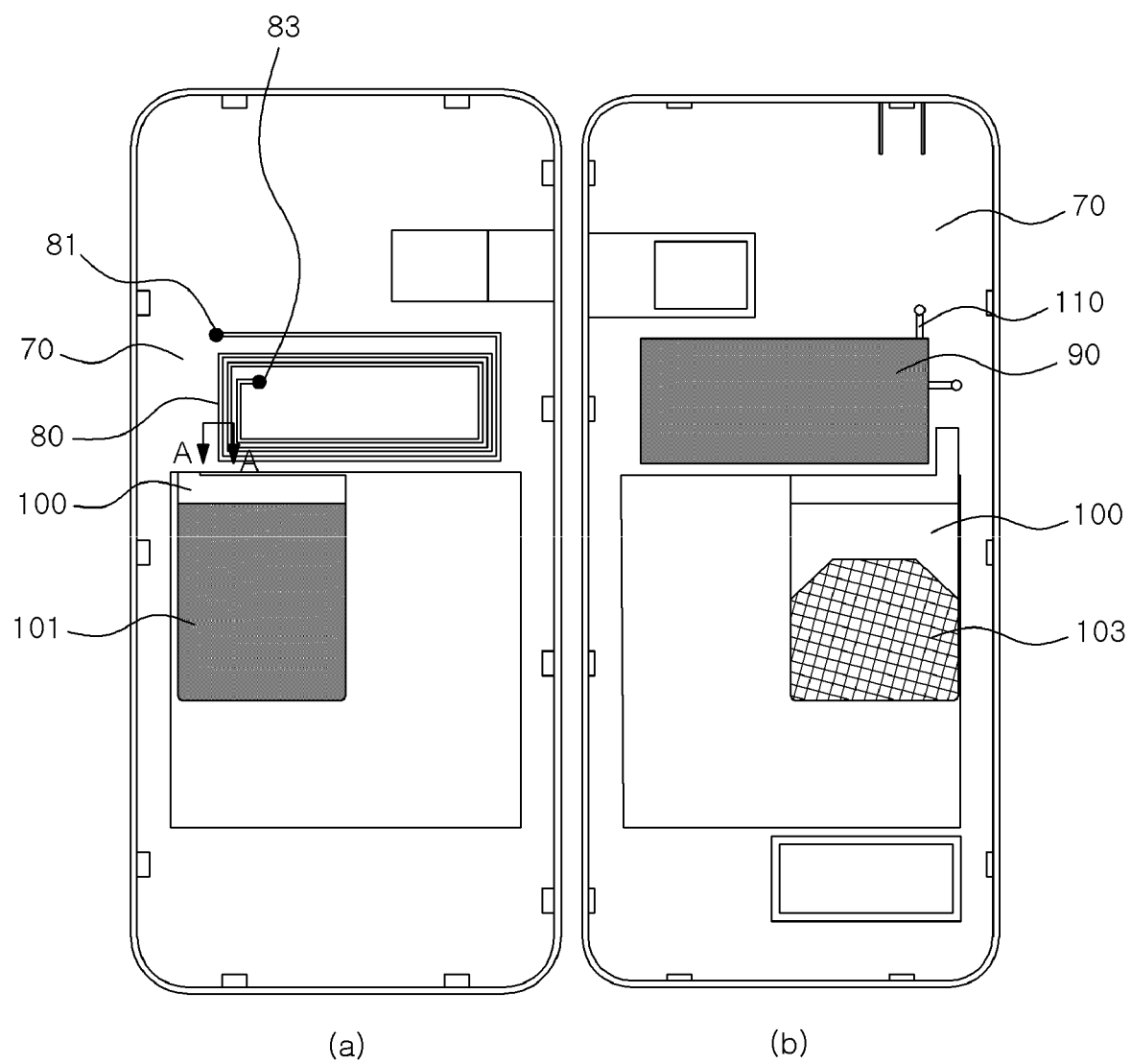
FIG. 5 is a reference view of an antenna module according to another embodiment of the present invention, in which (a) is a front surface of the antenna module, and (b) is a rear surface of the antenna module.

FIG. 1 is a reference view for explaining an antenna module according to an embodiment of the present invention, FIG. 2 shows a perspective view and a partially enlarged view of a front surface of the antenna module according to an embodiment of the present invention, and FIG. 3 is a perspective view of a rear surface of the antenna module according to an embodiment of the present invention. In addition, FIG. 4 is a schematic view of an antenna module according to another embodiment of the present invention, and FIG. 5 is a reference view of an antenna module according to another embodiment of the present invention, in which (a) is a front surface of the antenna module, and (b) is a rear surface of the antenna module.

The antenna module according to the present embodiment is installed in a wireless communication terminal to wirelessly transmit/receive data.

The antenna module according to an embodiment of the present invention may include a first antenna 20 and a second antenna 40.

The first antenna 20 may be formed on one surface of an injection-molded product.

The injection-molded product may be formed by injection molding an insulating material. In this case, the injection-molded product may be an antenna carrier 10 or a case of a wireless communication terminal (to be described below).

Figure 6:
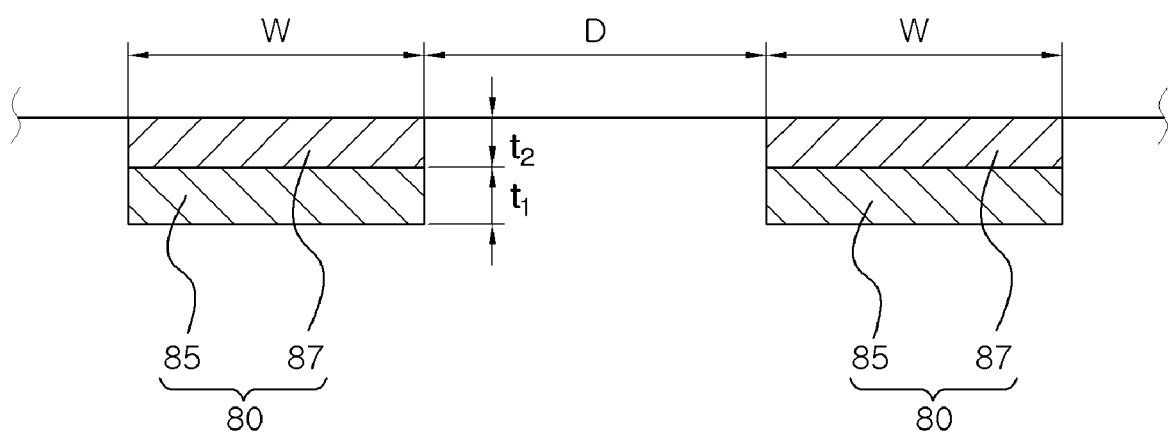
FIG. 6 is a sectional view taken along line A-A of the antenna module shown in FIG. 5 according to another embodiment of the present invention.

FIGS. 1 to 3 are views for explaining an embodiment when the injection-molded product of the antenna module of an embodiment of the present invention is the antenna carrier 10, and FIGS. 4 to 6 are views for explaining an embodiment when the injection-molded product of the antenna module of the present invention is the wireless communication terminal.

Hereinafter, description will be made with reference to FIGS. 1 to 6 when the injection-molded product is the antenna carrier 10 and when the injection-molded product is a case of a wireless communication terminal, and duplicated description will be omitted.

First, referring to FIGS. 1 to 3 where the injection-molded product is the antenna carrier 10, the injection-molded product may be formed of a synthetic resin material such as a polyester resin, polycarbonate (PC) and the like in order to maintain the atmospheric corrosion resistance, impact resistance and mechanical strength of the antenna carrier 10. In this case, the antenna carrier 10 may be mounted on a main board (not shown) of the wireless communication terminal.

The first antenna 20 may be used for transmission and reception of an electronic signal (for example, a wireless communication signal) and may have a configuration that receives power from a PCB and radiates an electronic signal into a space, and may be provided in the antenna carrier 10 to transmit or receive a wireless signal.

The first antenna 20 may be formed on one surface of the antenna carrier 10.

In this case, the first antenna 20 may be formed on the antenna carrier 10 by a Molded Interconnect Device (MID) method.

The MID (Molded Interconnection Device) method is to form a three-dimensional circuit component by forming a conductive circuit on a predetermined member such as a plastic molded product and it may provide a mechanical function or an electrical function by realizing the free three-dimensionality.

When the antenna is formed by the MID method, a fixed point space that is required in the conventional mechanical type antenna for fixing the antenna is not necessary, so the height of the antenna can be secured as much as possible, so that the antenna module can be miniaturized and the loop antenna radiation efficiency can be increased. In addition, since the antenna can be produced through a batch automation process, mass production is possible and quality control is easy.

Hereinafter, a method in which the first antenna 20 is formed on one surface of the antenna carrier 10 will be described.

In this case, 'one surface' may mean a 'front surface' of the antenna carrier 10, and 'the other side' may mean a 'rear surface (bottom surface)' of the antenna carrier 10. In the present embodiment, the first antenna 20 has been described based on the fact that it is formed on one surface of the antenna carrier 10, but otherwise, it may be formed on the other surface of the antenna carrier 10.

The first antenna 20 may be formed by forming a radiation pattern on one surface of the injection-molded antenna carrier 10 and plating the radiation pattern.

In detail, first, a structure (carrier) is formed with a material containing a non-conductive and chemically stable heavy metal complex, and a part of the structure is exposed to a laser such as a UV (Ultra Violet) laser, an excimer laser, etc., thereby exposing a metal seed by breaking the chemical bonds of the structure. Next, the structure is metalized to form a conductive material on the laser-exposed portion of the structure.

The conductive material may be formed by plating a plating solution on a radiation pattern formed through laser exposure, the plating solution may include copper and nickel, and the plating may be performed by an electrolytic plating method or an electroless plating method. The radiation pattern may be formed as a meander line in order to effectively receive an external signal.

At this point, in order to improve the plating efficiency of the conductive material, a treatment process for treating the surface of the radiation pattern formed through the laser exposure may be further performed.

The surface treatment process for the radiation pattern may be a process for applying a coating solution, wherein the applied coating solution may include Pd (palladium).

Since the coating solution containing palladium is applied to the surface of the radiation pattern formed through the laser exposure, the plating layer may have a compact and uniform thickness through the plating using the plating solution.

In this case, the first antenna 20 may be formed of a first plating layer including Cufmf and a second plating layer including Ni, and a detailed description thereof will be given later with reference to FIG. 6.

In this case, the width of the radiation pattern of the first antenna 20 is preferably 0.3 mm or more, and the spacing distance between the radiation patterns is preferably 0.4 mm or more in consideration of the interference between the radiation patterns.

In this case, the first antenna 20 may be an NFC (Near Field Communication) antenna for short-range communication.

Since the first antenna 20 is implemented through the MID method rather than the method of implementing the antenna on the FPCB, an antenna for wireless communication can be formed directly on the antenna carrier 10 that is injection molded, thereby reducing the overall thickness of the antenna, and thus the wireless communication terminal can be formed in a slim structure.

The shielding layer 30 may be formed to at least partially overlap the first antenna 20 formed on the injection-molded product.

In the present embodiment, the term 'overlapping' means that the area of the first antenna 20 partially overlaps the area of the shielding layer 30.

The shielding layer 30 is formed of a magnetic material, and shields electromagnetic waves generated from the first antenna 20 to collect the electromagnetic waves in a desired direction, or shields electromagnetic waves generated from electronic components such as a PCB disposed on one surface of the antenna carrier 10 to suppress the electromagnetic interference.

According to the present embodiment, the shielding layer 30 for shielding the electromagnetic waves may be disposed to overlap the first antenna 20 in order to effectively shield the electromagnetic waves, thereby improving the radiation performance of the first antenna 20.

Meanwhile, the shielding layer 30 may be formed on the other surface of the antenna carrier 10 to overlap the first antenna 20.

According to the present embodiment, the shielding layer 30 may be disposed to be spaced apart from the first antenna 20 with the antenna carrier 10 interposed therebetween. Since the shielding layer 30 is spaced apart from the first antenna 20 with the antenna carrier 10 interposed therebetween without directly attaching the shielding layer 30 to the first antenna 20, the shielding performance for the electromagnetic waves can be improved, and accordingly, the antenna performance of the first antenna 20 can be improved.

In detail, a main board (not shown) may be disposed on the other side of the antenna carrier 10, and the antenna performance may be deteriorated due to the metal material of the main board (not shown). In order to solve the above problem, a shielding sheet may be provided on the antenna radiation pattern, but since the shielding sheet also contains a metal component, the antenna performance may be affected when the shielding sheet comes into contact with the antenna radiation pattern.

According to the present embodiment, the shielding layer 30 is spaced apart from the first antenna 20 with the antenna carrier 10 interposed therebetween without directly attaching the shielding layer 30 to the first antenna 20, so that an air layer is formed between the antenna carrier 10 and the shielding layer 30, thereby improving the antenna performance.

Although the present embodiment has been described in that the shielding layer 30 is spaced apart from the first antenna 20 with the antenna carrier 10 interposed therebetween, it is also possible to form the shielding layer 30 on the other side of the first antenna 20 when the first antenna 20 is formed on the other side of the antenna carrier 10. In this case, the shielding layer 30 may be formed in direct contact with the first antenna 20.

The shielding layer 30 may include ferrite. Specifically, the shielding layer 30 may be used as a single material such as a magnetic alloy or a ferrite sintered body, or may be used as a composite material which is obtained by mixing magnetic metal powder and/or ferrite powder with an insulating resin, rubber-based component, ceramic or non-magnetic metal, etc., and extruding, pressing, or film casting the composite material.

The shielding layer 30 may be prepared in the form of a plate-shaped sheet having a predetermined area, and the shielding layer 30 and the antenna carrier 10 may be bonded to each other through an adhesive layer (not shown).

In this case, the shielding layer 30 may be configured to correspond to the outer peripheral shape of the first antenna 20. It is necessary to optimize the width of the shielding layer 30 in order to improve the shielding performance for the electromagnetic waves within the limited size of the antenna carrier. According to the present embodiment, the shielding layer 30 may have the width corresponding to the outer peripheral shape of the first antenna 20.

Referring to (a) and (b) of FIG. 1, the shielding layer 30 may have the width corresponding to the shape of an antenna radiation pattern line formed on the outermost side of the first antenna 20, and it is possible to optimize the shielding performance for the electromagnetic waves within a limited space by forming the shielding layer 30 to correspond to the outer peripheral shape of the first antenna 20.

However, the shielding layer 30 may be formed in various sizes and shapes as long as it can shield the electromagnetic waves, and may be formed in a size smaller than the area of the outer periphery of the first antenna 20.

A second antenna 40 may be formed on either side of the antenna carrier 10. The second antenna 40 may be spaced apart from the first antenna 20 and may be formed on one surface of a Field Programmable Circuit Board (FPCB). The second antenna 40 may be obtained by forming an antenna pattern on a printed circuit board (FPCB) having excellent flexibility, and the antenna pattern may be prepared in the form of a radiation pattern such as a meander line.

In this case, a protective film layer 41 for protecting the antenna pattern may be provided on one surface of the second antenna 40.

In addition, a nano-sheet layer 43 may be formed on the other surface of the second antenna 40. The protective film layer 41 may be formed on a surface where the antenna pattern is formed in order to protect the antenna pattern, and the nano-sheet layer 43 may be formed on a surface opposite to the surface on which the protective film layer 41 is formed in order to improve the performance of the second antennas 40 by absorbing the electromagnetic waves.

In this case, the second antenna 40 may be a magnetic secure transmission (MST) antenna for magnetic payment.

According to the antenna module of the present embodiment, the NFC antenna is formed on the upper portion and the MST antenna is formed on the lower portion while being spaced apart from the NFC antenna, so that the NFC function and the MST function can be simultaneously implemented.

Meanwhile, a contact circuit 50 may be formed on the other surface of the antenna carrier 10. The contact circuit 50 may be formed on the other surface of the antenna carrier 10 (a surface opposite to the surface on which the first antenna 20 is formed). The contact circuit 50 may be formed through the MID method, and since the MID method is the same as the process for forming the first antenna 20 described above, a detailed description thereof will be omitted.

The contact circuit 50 may be electrically connected to the first antenna 20. In this case, the first antenna 20 and the contact circuit 50 may be electrically connected to each other through via holes 11 and 13. The via holes 11 and 13 may be formed through the antenna carrier 10 and may be prepared as a pair. In this case, upper portions of the via holes 11 and 13 may be connected to the first antenna 20 and lower portions of the via holes 11 and 13 may be connected to the contact circuit 50, so that the first antenna 20 and the contact circuit 50 may be electrically connected to each other.

An end of the contact circuit 50 may be connected to a PCB (not shown) to receive electric power, and an electrical signal may be transmitted to the first antenna 20 as the electric power is supplied from the electrical circuit.

According to the present embodiment, an electrical signal may be transmitted to the first antenna 20 through the contact circuit 50 to which current is applied, so that the first antenna 20 may function as an NFC antenna, and the second antenna 40 formed at a lower portion of the antenna carrier 10 may function as an MST antenna, thereby simultaneously performing the NFC function and the MST function.

In addition, since the first antenna 20, which is an NFC antenna, is implemented through the MID method, the thickness of the antenna module can be reduced so that the wireless communication terminal can be slimmed/miniaturized, and the shielding layer 30 for shielding the electromagnetic waves is provided on the opposite surface of the antenna carrier 10 where the first antenna 20 is formed such that the shielding layer 30 corresponds to the first antenna 20, so that the electromagnetic waves can be effectively shielded, thereby improving the radiation performance of the first antenna 20.

FIGS. 4 to 6 are reference views for explaining an antenna module according to another embodiment of the present invention and description will be made below by taking into account that the injection-molded product is a case 70 of a wireless communication terminal.

Referring to FIG. 4, the antenna module according to another embodiment of the present invention may include a first antenna 80 and a second antenna 100.

The first antenna 80 may be formed on one surface of the injection-molded product, and according to the present embodiment, the injection-molded product of the antenna module may be the case 70 of the wireless communication terminal. In this case, the case 70 of the wireless communication terminal may be a rear case 70.

In this case, 'one surface' may mean the 'front surface' of the case 70 of the wireless communication terminal, and 'the other surface' may mean the 'back surface (bottom surface)' of the case 70 of the wireless communication terminal. Although the present embodiment has been described in that the first antenna 80 is formed on one surface of the case 70 of the wireless communication terminal, it is also possible to form the first antenna 80 on the other surface of the case of the wireless communication terminal.

Since the first antenna 80 of the antenna module according to the present embodiment is the same as the previous embodiment except for the case where the injection-molded product is the case 70, a detailed description thereof will be omitted.

Referring to FIG. 6, the first antenna 80 may be formed on the case 70 of the wireless communication terminal through the MID method, and the first antenna 80 may include a first plating layer 85 containing Cu and a second plating layer 87 including Ni.

The second plating layer 87 containing Ni may be formed on the upper surface of the first plating layer 85 to prevent Cu contained in the first plating layer 85 from being oxidized, and the second plating layer 87 containing Ni to improve conductivity at a limited pattern height is preferably configured to have a minimum height for preventing oxidation of the first plating layer 85.

In this case, the first plating layer 85 may have a thickness of 10~15 μm (t1), and the second plating layer 87 may have a thickness of 1~5 μm (t2).

At this point, the width (W) of the radiation pattern of the first antenna 80 is preferably 0.5 mm or more, and the spacing distance (D) between the radiation patterns is preferably 0.4 mm or more in consideration of the interference between the radiation patterns.

The first antenna 80 may be an NFC (Near Field Communication) antenna for short-range communication.

Since the first antenna 80 can be obtained through the MID method rather than the method of implementing the antenna on the FPCB, an antenna for wireless communication can be formed directly on the injection-molded product of the case 70, thereby eliminating the need for a separate antenna device. Thus, the thickness of the antenna module can be slimmed as a whole, and the wireless communication terminal can be formed in a slim structure.

Referring to (b) of FIG. 5, the shielding layer 90 may be formed on the other surface of the case 70 of the wireless communication terminal. The shielding layer 90 may be formed of a magnetic material, and may be configured to correspond to the outer peripheral shape of the first antenna 80. It is necessary to optimize the width of the shielding layer 90 in order to improve the shielding performance for the electromagnetic waves within the limited space. According to the present embodiment, the shielding layer 90 may have the width corresponding to the outer peripheral shape of the first antenna 80.

Although the present embodiment has been described in that the shielding layer 30 is spaced apart from the first antenna 80 with the case 70 of the wireless communication terminal interposed therebetween, it is also possible to form the shielding layer 30 on the other side of the first antenna 80 when the first antenna 80 is formed on the other side of the case 70 of the wireless communication terminal. In this case, the shielding layer 30 may be formed in direct contact with the first antenna 80.

In addition, the shielding layer 30 may be formed in various sizes and shapes as long as it can shield the electromagnetic waves, and may be formed in a size smaller than the area of the outer peripheral shape of the first antenna 80.

The second antenna 100 may be formed on either side of the case 70. The second antenna 100 may be spaced apart from the first antenna 80 and may be formed on one surface of a Field Programmable Circuit Board (FPCB).

In this case, a protective film layer for protecting the antenna pattern may be provided on one surface of the second antenna 100 (see (a) of FIG. 5).

In addition, the nano-sheet layer 103 may be formed on the other surface of the second antenna 100 (see to (b) of FIG. 5). The protective film layer 101 may be formed on the surface where the antenna pattern is formed to protect the antenna pattern, and the nano sheet layer 103 may be formed on the surface opposite to the surface where the protective film layer 101 is formed to improve the performance of the antenna 100 by absorbing the electromagnetic waves.

In this case, the second antenna 100 may be a magnetic secure transmission (MST) antenna for magnetic payment.

According to the antenna module of the present embodiment, the NFC antenna is formed on the upper portion and the MST antenna is formed on the lower portion while being spaced apart from the NFC antenna, so that the NFC function and the MST function can be simultaneously implemented. In addition, since the NFC antenna is implemented directly on the case 70 of the wireless communication terminal, there is no need for a separate NFC antenna device, so that the wireless communication terminal can be slimmed.

Meanwhile, the contact circuit 110 may be formed on the other surface of the case 70. The contact circuit 110 may be formed on the other surface of the case 70 (a surface opposite to the surface on which the first antenna 80 is formed) (see (b) of FIG. 5).

The contact circuit 110 may be electrically connected to the first antenna 80. In this case, the first antenna 80 and the contact circuit 110 may be electrically connected to each other through the via holes 81 and 83. The via holes 81 and 83 may be formed through the case 70 and may be prepared as a pair. In this case, since upper portions of the via holes 81 and 83 are connected to the first antenna 80, and lower portions of the via holes 81 and 83 are connected to the contact circuit 110, the first antenna 80 and the contact circuit 110 can be electrically connected to each other.

An end of the contact circuit 110 may be connected to a PCB (not shown) to receive electric power, and an electrical signal is transmitted to the first antenna 80 as the electric power is supplied from the electrical circuit.

According to the present embodiment, an electrical signal is transmitted to the first antenna 80 through the contact circuit 110 to which current is applied, so that the first antenna 80 may function as an NFC antenna, and the second antenna 100 formed at the lower portion of the case 70 may function as an MST antenna, so that the NFC function and the MST function can be simultaneously performed.

In addition, since the first antenna 80, which is an NFC antenna, is directly implemented on the case of the wireless communication terminal through the MID method, the thickness of the antenna module can be reduced so that the wireless communication terminal can be slimmed/miniaturized, and the shielding layer 90 for shielding the electromagnetic waves is arranged to overlap the first antenna 80, the electromagnetic waves can be effectively shielded, thereby improving the radiation performance of the first antenna 80.

Exemplary embodiments according to the present invention have been described above, and it is obvious to those skilled in the art that the present invention can be embodied in other specific forms without departing from the spirit or scope of the present invention in addition to the above-described embodiments. Therefore, the above-described embodiments are regarded as illustrative rather than restrictive, and accordingly, the present invention is not limited to the above description, but may be modified within the scope of the appended claims and their equivalents.

What is claimed is:

1. An antenna module comprising:
   a first antenna formed on one surface of an injection-molded product;
   a contact circuit formed on the other surface of the injection-molded product and electrically connected to the first antenna; and
   a shielding layer formed on the other surface of the injection-molded product at a position corresponding to the first antenna and configured to at least partially overlap the first antenna formed on one surface of the injection-molded product to shield electromagnetic waves,
   wherein the injection-molded product has a thickness greater than a sum of a thickness of the first antenna and a thickness of the shielding layer, so that the shielding layer is spaced apart from the first antenna by the thickness of the injection-molded product.

2. The antenna module of claim 1, wherein the injection-molded product includes an antenna carrier or a case of a wireless communication terminal.

3. The antenna module of claim 2, wherein the injection-molded product includes an antenna carrier mounted on a main board of a wireless communication terminal and having an opening area in which electronic components are installed,
   the first antenna is formed on one surface of the antenna carrier in adjacent to the opening area of the antenna carrier, and
   the contact terminal is configured to come into contact with a terminal of the main board.

4. The antenna module of claim 1, further comprising a second antenna spaced apart from the first antenna and formed on one surface of a flexible printed circuit board (FPCB).

5. The antenna module of claim 4, wherein the first antenna includes an antenna for Near Field Communication (NFC), and the second antenna includes an antenna for Magnetic Secure Transmission (MST).

6. The antenna module of claim 5, wherein the shielding layer is formed on the other surface of the injection-molded product at a position corresponding to a position of the first antenna.

7. The antenna module of claim 4, wherein a nano sheet layer is formed on the other surface of the second antenna.

8. The antenna module of claim 7, wherein a protective film layer is formed on one surface of the second antenna.

9. The antenna module of claim 1, wherein the shielding layer includes ferrite.

10. The antenna module of claim 1, wherein the shielding layer is configured to correspond to an outer peripheral shape of the first antenna.

11. The antenna module of claim 1, wherein the first antenna includes a first plating layer including Cu and a second plating layer including Ni.

12. The antenna module of claim 11, wherein the first plating layer has a thickness of 10-15 μm, and the second plating layer has a thickness of 1-5 μm.

13. The antenna module of claim 1, wherein a contact circuit is formed on the other surface of the injection-molded product of the first antenna, and
 the first antenna and the contact circuit are electrically connected to each other.

14. The antenna module of claim 1, wherein the first antenna and the contact circuit are connected to each other through a via hole.

* * * * *